(12) United States Patent
Zhou et al.

(10) Patent No.: US 11,653,231 B2
(45) Date of Patent: May 16, 2023

(54) JOINT BEAM FAILURE DETECTION

(71) Applicant: QUALCOMM Incorporated, San Diego, CA (US)

(72) Inventors: Yan Zhou, San Diego, CA (US); Tao Luo, San Diego, CA (US); Mostafa Khoshnevisan, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 16/949,410

(22) Filed: Oct. 28, 2020

(65) Prior Publication Data
US 2021/0136604 A1    May 6, 2021

Related U.S. Application Data

(60) Provisional application No. 62/929,658, filed on Nov. 1, 2019.

(51) Int. Cl.
*H04W 24/04* (2009.01)
*H04W 72/04* (2023.01)
*H04L 5/00* (2006.01)

(52) U.S. Cl.
CPC ............ *H04W 24/04* (2013.01); *H04L 5/001* (2013.01); *H04W 72/042* (2013.01)

(58) Field of Classification Search
CPC .... H04W 24/04; H04W 72/042; H04L 5/001; H04L 5/0023; H04B 7/088; H04B 7/0695
See application file for complete search history.

(56) References Cited

U.S. PATENT DOCUMENTS

| | | | |
|---|---|---|---|
| 2010/0182968 A1* | 7/2010 | Ojala | H04W 72/042 370/329 |
| 2017/0215186 A1* | 7/2017 | Chen | H04W 72/0453 |
| 2019/0173740 A1 | 6/2019 | Zhang et al. | |

(Continued)

FOREIGN PATENT DOCUMENTS

| | | | | |
|---|---|---|---|---|
| WO | WO-2020192786 A1 * | 10/2020 | | H04L 5/0023 |
| WO | WO-2021062832 A1 * | 4/2021 | | |

OTHER PUBLICATIONS

International Search Report and Written Opinion—PCT/US2020/070722—ISA/EPO—dated Feb. 1, 2021.

(Continued)

*Primary Examiner* — Ayaz R Sheikh
*Assistant Examiner* — Tarell A Hampton
(74) *Attorney, Agent, or Firm* — Harrity & Harrity, LLP

(57) ABSTRACT

A method, an apparatus, and a computer program product for wireless communication are provided. A component carrier group may be configured for beam management, such that beam management on a first component carrier is applied to one or more second component carriers to reduce signaling overhead associated with controlling a defined group of component carriers. A user equipment may be configured to identify a group of component carriers and, when a beam failure detection reference signal is received from a base station on a first component carrier, identify a beam failure condition for the first component carrier and one or more second component carriers of the group of component carriers.

30 Claims, 9 Drawing Sheets

(56) References Cited

U.S. PATENT DOCUMENTS

2019/0306850 A1 10/2019 Zhang et al.

OTHER PUBLICATIONS

Qualcomm Incorporated: "Enhancements on Multi-Beam Operation", 3GPP Draft, 3GPP TSG-RAN WG1 Meeting #96-Bis, R1-1905027, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700136, 26 pages, Retrieved from the Internet: URL: http://www.3gpp.org/ftp/Meetings%5F3GPP% 5FSYNC/RAN1/Docs/R1%201905027%2Ezip, [retrieved on Apr. 7, 2019] paragraph [0002],Section 1; p. 1, Section 2.5; p. 9.

* cited by examiner

JOINT BEAM FAILURE DETECTION

CROSS-REFERENCE TO RELATED APPLICATION

This Patent Application claims priority to U.S. Provisional Patent Application No. 62/929,658, filed on Nov. 1, 2019, entitled "JOINT BEAM FAILURE DETECTION," and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for joint beam failure detection.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some communications systems, such as 5G, a bandwidth may be divided into a plurality of bandwidth parts and/or a plurality of component carriers. Each bandwidth part and/or component carrier may enable uplink and/or downlink communication between a UE and a BS using parameters that may be specific to the bandwidth part and/or component carrier. For example, a UE may communicate with a BS on a first bandwidth part in accordance with a first communication configuration and may communicate with the BS on a second bandwidth part in accordance with a second communication configuration. This may enable flexibility in deployments of UEs, power saving configurations, and/or the like relative to a single communication configuration for an entire bandwidth.

ABS may transmit a medium access control (MAC) control element (CE) to activate a set of transmission configuration indicator (TCI) states (e.g., associated with a set of TCI state identifiers) for a physical downlink shared channel (PDSCH). The UE may apply the set of TCI states to a set of bandwidth parts and/or component carriers within a common band and/or sharing a common analog beamformer. The UE may receive signaling, from the B S, indicating to which component carriers, of a plurality of candidate component carriers within a bandwidth, the UE is to apply the set of TCI states. For example, the BS may provide RRC signaling indicating the set of component carriers and/or a set of bandwidth parts corresponding to the set of component carriers, and the UE may group the set of component carriers based on the RRC signaling. In this way, when the UE receives signaling (e.g., a MAC CE) to activate a set of TCI states, the UE may apply the subsequent signaling to the group of component carriers rather than to all component carriers of the plurality of candidate component carriers. In some cases, the UE may be configured with a plurality of groups of component carriers. In this case, when the UE receives signaling to activate a set of TCI states for a particular component carrier, the UE may apply the signaling to each component carrier within a component carrier group that includes the particular component carrier.

The UE may monitor for beam failure detection reference signals that may be received in any of the plurality of component carriers of a component carrier group. For example, the BS may schedule resources for the beam failure detection reference signals in each component carrier and may periodically transmit the beam failure detection reference signals in each component carrier. However, component carriers of a component carrier group sharing a common analog beamformer may have correlated beam failures. In other words, a beam failure in a first component carrier of a component carrier group may be correlative of a beam failure in a second component of the same component carrier group. In such cases, monitoring for beam failure detection reference signals in each component carrier may use excessive network resources and/or result in added UE complexity to enable such monitoring.

Some aspects described herein enable joint beam failure detection. For example, a UE may receive signaling from a BS that configures a group of component carriers. In this case, when the UE detects a beam failure condition for a first component carrier of the group of component carriers (e.g., based at least in part on receiving a beam failure detection reference signal), the UE may determine that a beam failure condition has occurred for other component carriers of the group of component carriers. In this way, the UE obviates a need to detect a beam failure detection reference signal in each component carrier of the component carrier group. Moreover, the BS may forgo transmitting beam failure detection reference signals in each component carrier of the component carrier group based at least in part on the UE associating a beam failure condition in a first component carrier of the component carrier group with beam failure conditions in one or more second component carriers of the component carrier group. In this way, the UE and the BS enable reduced use of network resources, reduced power consumption, reduced UE complexity, and/or the like.

In an aspect of the disclosure, a method, a user equipment (UE), a base station (BS), an apparatus, and a computer program product are provided.

In some aspects, a method of wireless communication, performed by a UE, may include detecting a beam failure detection reference signal for a first component carrier of a group of component carriers, wherein at least one second component carrier and the first component carrier share a quasi-co-location parameter; and initiating a beam failure recovery procedure for the first component carrier and the at least one second component carrier based at least in part on a measurement of the beam failure detection reference signal and identifying the at least one second component carrier associated with the beam failure detection reference signal.

In some aspects, a method of wireless communication, performed by a BS, may include transmitting, to a UE, a beam failure detection reference signal on a first component carrier of a group of component carriers that share a quasi-co-location parameter; and communicating with the UE to initiate a beam failure recovery procedure for the first component carrier and at least one second component carrier, of the group of component carriers, based at least in part on transmitting the beam failure detection reference signal on the first component carrier.

In some aspects, a UE for wireless communication may include memory and one or more processors operatively coupled to the memory. The memory and the one or more processors may be configured to detect a beam failure detection reference signal for a first component carrier of a group of component carriers, wherein at least one second component carrier, of the group of component carriers, and the first component carrier share a quasi-co-location parameter; and initiate a beam failure recovery procedure for the first component carrier and the at least one second component carrier based at least in part on a measurement of the beam failure detection reference signal and identifying the at least one second component carrier associated with the beam failure detection reference signal.

In some aspects, a BS for wireless communication may include memory and one or more processors operatively coupled to the memory. The memory and the one or more processors may be configured to transmit, to a UE, a beam failure detection reference signal on a first component carrier of a group of component carriers that share a quasi-co-location parameter; and communicate with the UE to initiate a beam failure recovery procedure for the first component carrier and at least one second component carrier, of the group of component carriers, based at least in part on transmitting the beam failure detection reference signal on the first component carrier.

In some aspects, a non-transitory computer-readable medium may store one or more instructions for wireless communication. The one or more instructions, when executed by one or more processors of a UE, may cause the one or more processors to detect a beam failure detection reference signal for a first component carrier of a group of component carriers, wherein at least one second component carrier, of the group of component carriers, and the first component carrier share a quasi-co-location parameter; and initiate a beam failure recovery procedure for the first component carrier and the at least one second component carrier based at least in part on a measurement of the beam failure detection reference signal and identifying the at least one second component carrier associated with the beam failure detection reference signal.

In some aspects, a non-transitory computer-readable medium may store one or more instructions for wireless communication. The one or more instructions, when executed by one or more processors of a BS, may cause the one or more processors to transmit, to a UE, a beam failure detection reference signal on a first component carrier of a group of component carriers that share a quasi-co-location parameter; and communicate with the UE to initiate a beam failure recovery procedure for the first component carrier and at least one second component carrier, of the group of component carriers, based at least in part on transmitting the beam failure detection reference signal on the first component carrier.

In some aspects, an apparatus for wireless communication may include means for detecting a beam failure detection reference signal for a first component carrier of a group of component carriers, wherein at least one second component carrier, of the group of component carriers, and the first component carrier share a quasi-co-location parameter; and means for initiating a beam failure recovery procedure for the first component carrier and the at least one second component carrier based at least in part on a measurement of the beam failure detection reference signal and identifying the at least one second component carrier associated with the beam failure detection reference signal.

In some aspects, an apparatus for wireless communication may include means for transmitting, to a UE, a beam failure detection reference signal on a first component carrier of a group of component carriers that share a quasi-co-location parameter; and means for communicating with the UE to initiate a beam failure recovery procedure for the first component carrier and at least one second component carrier, of the group of component carriers, based at least in part on transmitting the beam failure detection reference signal on the first component carrier.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
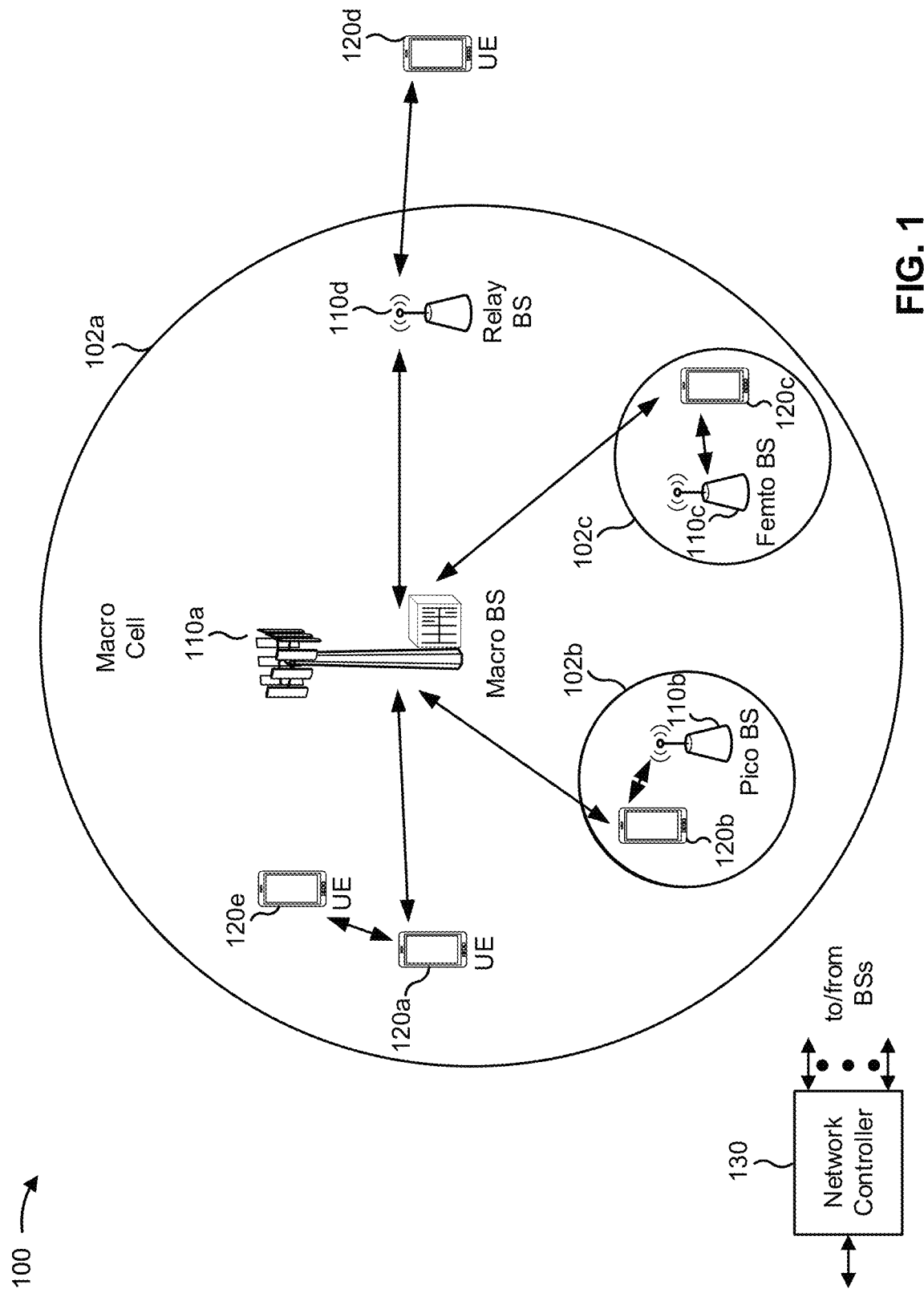
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed. Some RATs may be divided into component carriers and/or associated bandwidth parts, such as in a carrier aggregation deployment. In such a case, a BS may group a set of component carriers into a component carrier group and may transmit beam failure recovery reference signals on a single component carrier of the component carrier group to enable a UE to detect beam failure for any component carrier of the component carrier group.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
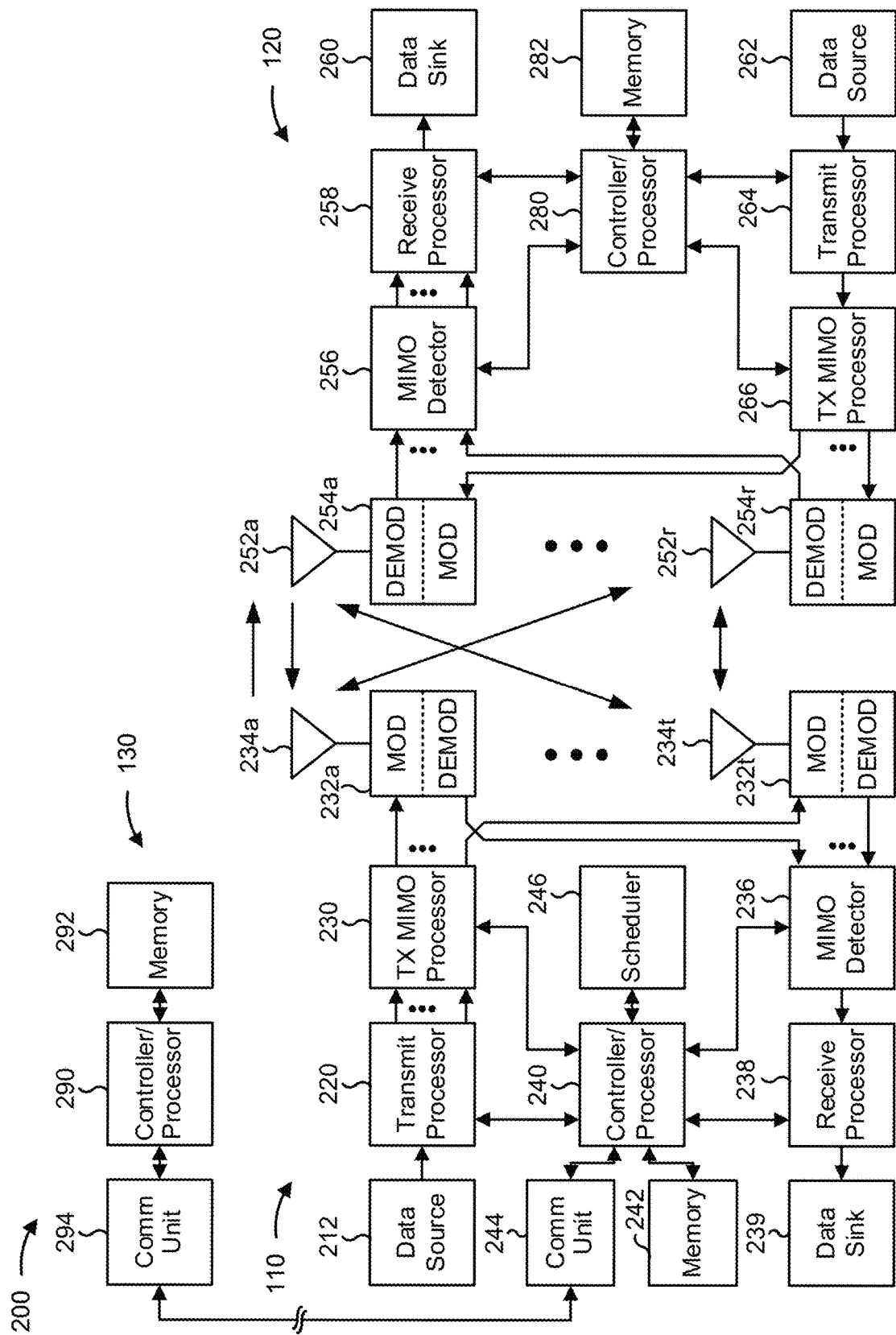
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS, a beam failure detection reference signal on, for example, a first component carrier of a group of component carriers) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information (e.g., beam failure detection reference signals) and system information to a controller/processor 280. A channel processor may determine RSRP, RSSI, RSRQ, CQI, and/or the like. Controller/process 280 may determine that a beam failure detection reference signal received on a first component carrier applies to one or more second component carriers of a common component carrier group.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with joint beam failure detection, as described in more detail elsewhere herein. For example, controller/processor 240 of base station 110, controller/processor 280 of UE 120, and/or any other component(s) of FIG. 2 may perform or direct operations of, for example, method 400 of FIG. 4, method 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink, and may include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink, and may include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHz may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams, and up to 2 streams per UE. Aggregation of multiple cells may be supported with up to 8 serving cells. Alternatively, 5G may support a different air interface, other than an OFDM-based interface. 5G networks may include entities such as central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
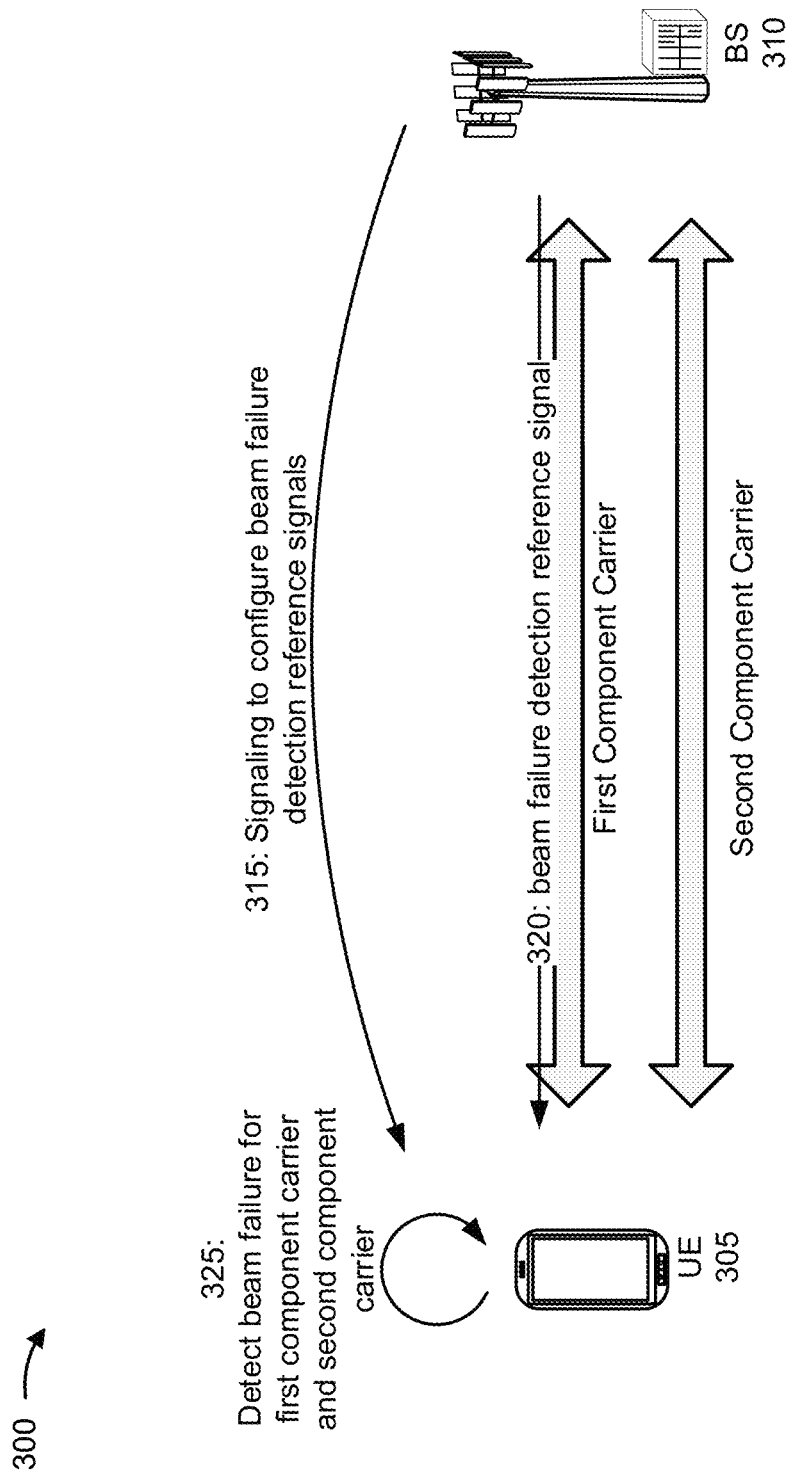
FIG. 3 is a diagram illustrating an example of joint beam failure detection.

FIG. 3 is a diagram illustrating an example 300 of joint beam failure detection. As shown in FIG. 3, example 300 includes a UE 305 and a BS 310 communicating using a first component carrier, a second component carrier, and/or the like of a component carrier group.

At 315, BS 310 may transmit and UE 315 may receive signaling to configure beam failure detection reference signals. For example, BS 310 may configure a beam failure detection reference signal on a particular component carrier to enable beam failure detection across a plurality of component carriers. In some aspects, BS 310 may select a single component carrier on which to configure beam failure detection reference signals. For example, BS 310 may configure beam failure detection reference signals, on the first component carrier, corresponding to each unique quasi-co-location (QCL) type-D source for a plurality of component carriers in a component carrier group. In this case, UE 315 may monitor, based at least in part on receiving the signaling, only the first component carrier to detect beam failure detection reference signals.

In some aspects, BS 310 may indicate a component carrier group for which beam failure detection is to be performed using a beam failure detection reference signal on the first component carrier. For example, BS 310 may transmit radio resource control (RRC) signaling, medium access control (MAC) control element (CE) signaling, downlink control information (DCI) signaling, and/or the like to identify component carriers, of a plurality of candidate component carriers in a bandwidth, that are to be assigned to a component carrier group. In this case, the group of component carriers may be the same group of component carriers used for a component carrier group-based beam update procedure. In this way, BS 310 avoids using separate signaling for component carrier grouping for beam failure detection and for beam updates, thereby reducing overall signaling.

In some aspects, BS 310 may transmit signaling configuring the beam failure detection reference signals for an identified component carrier group. For example, BS 310 may transmit RRC signaling, MAC CE signaling, DCI signaling, and/or the like on the first component carrier to configure resources for transmitting subsequent beam failure detection reference signals. Additionally, or alternatively, UE 315 may determine a configuration of the beam failure detection reference signals without explicit configuration signaling. For example, UE 315 may determine that a control resource set (CORESET) transmission configuration indicator (TCI) state includes a single reference signal. In this case, UE 315 may determine that each unique reference signal in each CORESET TCI state of the component carrier group is the beam failure detection reference signal. Additionally, or alternatively, UE 315 may determine that a CORESET TCI state includes a plurality of reference signals (e.g., two reference signals). In this case, UE 315 may determine that each unique QCL type-D reference signal in each CORESET TCI state of the component carrier group is the beam failure detection reference signal.

In some aspects, BS 310 and/or UE 315 may select a particular beam failure detection reference signal to use, of a plurality of candidate beam failure detection reference signals for which resources have been allocated based at least in part on a rule. For example, BS 310 may select a beam failure detection reference signal with a lowest reference signal identifier value as the beam failure detection reference signal that BS 310 is to transmit. Additionally, or alternatively, BS 310 may select a particular quantity of beam failure detection reference signals to satisfy a limit on a maximum quantity of beam failure detection reference signals. For example, BS 310 may select a set of a particular quantity of beam failure detection reference signals with the lowest reference signal identifier values. In some aspects, BS 310 may transmit signaling to UE 315 indicating that UE 315 is to monitor only a subset of component carriers of the component carrier group to receive the selected beam failure detection reference signal.

At 320, BS 310 may transmit and UE 315 may receive a beam failure detection reference signal. For example, UE 315 may receive the beam failure detection reference signal on a first component carrier of a group of component carriers that share a quasi-co-location parameter. In this case, UE 315 may perform a measurement on the beam failure detection reference signal to determine whether a beam failure has occurred. For example, UE 315 may determine whether a block error rate (BLER) is less than a BLER threshold, whether a reference signal received power (RSRP) is less than an RSRP threshold, whether a reference signal received quality (RSRQ) is less than an RSRQ threshold, and/or the like.

At 325, UE 315 may detect a beam failure based at least in part on the beam failure detection reference signal. For example, based at least in part on receiving the beam failure detection reference signal on a first component carrier of a group of component carriers that share a quasi-co-location parameter (e.g., and based at least in part on a measurement of the beam failure detection reference signal), UE 120 may detect a beam failure on the first component carrier. Additionally, or alternatively, based at least in part on receiving the beam failure detection reference signal on a first component carrier of a group of component carriers that share a quasi-co-location parameter (e.g., quasi-co-location type-D), UE 120 may detect a beam failure on the second component carrier and/or one or more other component carriers of a component carrier group that includes the first component carrier. In this case, UE 315 and BS 310 may communicate to initiate a beam failure recovery procedure on the first component carrier, the second component carrier, and/or the like. In this way, BS 310 and UE 315 enable joint beam failure detection.

As indicated above, FIG. 3 is provided as an example. Other examples may differ from what is described with respect to FIG. 3.

Figure 4:
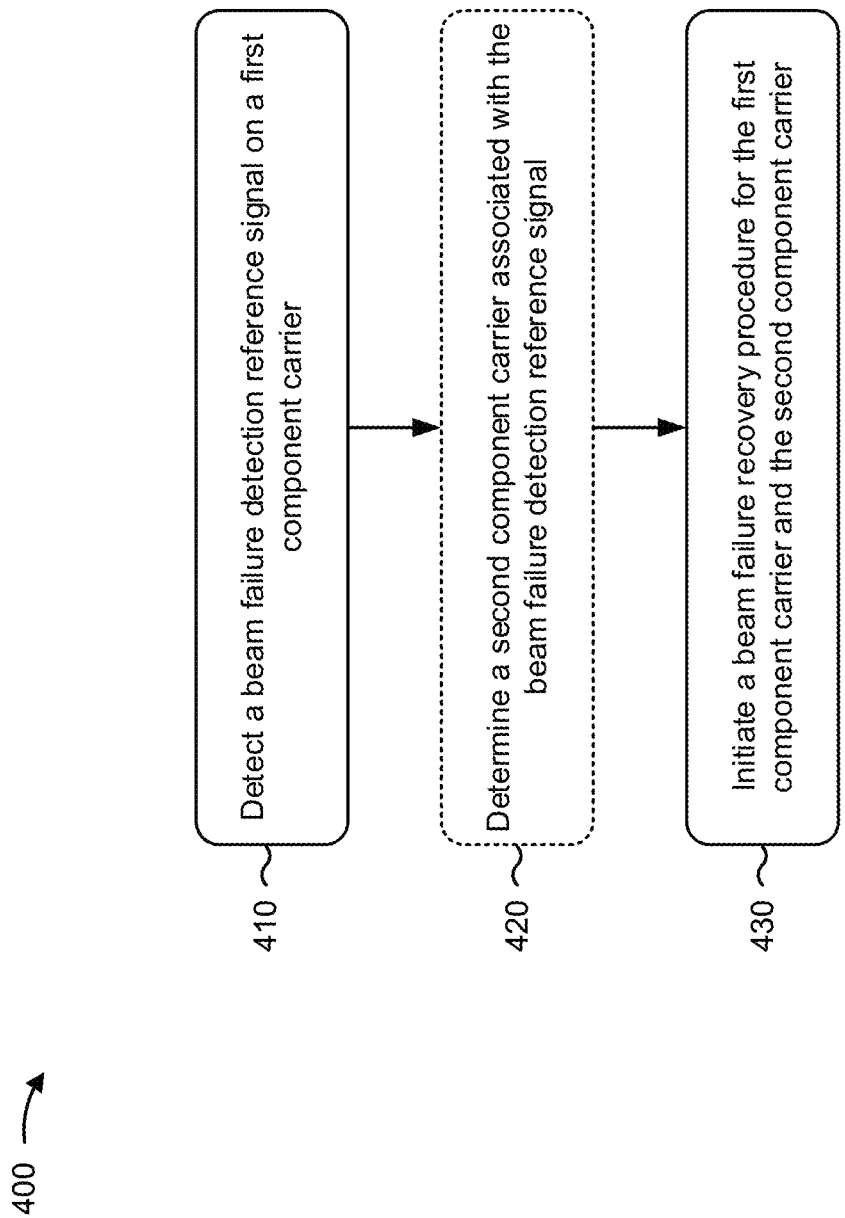
FIG. 4 is a flowchart of a method of wireless communication.

FIG. 4 is a flowchart of a method 400 of wireless communication. The method may be performed by UE (e.g., the UE 120, the UE 305, the apparatus 502/502', the UE 850 and/or the like).

At 410, the UE may detect a beam failure detection reference signal on a first component carrier. For example, the UE (e.g., using antenna 252, DEMOD 254, MIMO detector 256, receive processor 258, controller/processor 280, and/or the like), may detect a beam failure detection reference signal for a first component carrier of a group of component carriers, as described in more detail above. In a first aspect, the beam failure detection reference signal is a quasi-co-location type-D reference signal corresponding to each unique quasi-co-location type-D source (of a plurality of component carriers) is configured on a single component carrier of the group of component carriers. In a second aspect, alone or in combination with the first aspect, the UE may monitor resources of the group of component carriers, and detect the beam failure detection reference signal for the first component carrier based at least in part on monitoring the resources of the group of component carriers.

In a third aspect, alone or in combination with one or more of the first and second aspects, the UE may receive base station signaling that configures monitoring for the beam failure detection reference signal, and may receive the beam failure detection reference signal based at least in part on the base station signaling that configures monitoring for the beam failure detection reference signal. In a fourth aspect, alone or in combination with one or more of the first through third aspects, the base station signaling is radio resource control signaling, medium access control (MAC) control element signaling, downlink control information signaling, or beam update signaling. In a fifth aspect, alone or in combination with one or more of the first through fourth aspects, the UE may determine the beam failure detection reference signal based at least in part on control resource set (CORESET) transmission control indicator (TCI) states for the group of component carriers, which correspond to a configuration for monitoring for the beam failure detection reference signal based at least in part on the CORESET TCI states for the group of component carriers, and receive the beam failure detection reference signal based at least in part on the configuration for monitoring for the beam failure detection reference signal. In a sixth aspect, alone or in combination with one or more of the first through fifth aspects, the UE may receive base station signaling indicating that the UE is to monitor for the beam failure detection reference signal on a subset of the group of component carriers, wherein the subset of the group of component carriers includes the first component carrier, monitor to receive the beam failure detection reference signal on the subset of the group of component carriers, based at least in part on the base station signaling, and receive the beam failure detection reference signal based at least in part on monitoring to receive the beam failure detection reference signal on the subset of the group of component carriers.

At 420, in some aspects, the UE may determine a second component carrier associated with the beam failure detection reference signal. For example, the UE (e.g., using controller/processor 280 and/or the like), may determine at least one second component carrier, of the group of component carriers, associated with the beam failure detection reference signal. In some aspects, the at least one second component carrier and the first component carrier share a quasi-co-location parameter, as described in more detail above. In a seventh aspect, alone or in combination with one or more of the first through sixth aspects, the UE may receive base station signaling identifying the group of component carriers, and may determine the at least one second component carrier based at least in part on the base station signaling identifying the group of component carriers.

In an eighth aspect, alone or in combination with one or more of the first through seventh aspects, the base station signaling is radio resource control signaling, medium access control (MAC) control element signaling, downlink control information signaling, or beam update signaling. In a ninth aspect, alone or in combination with one or more of the first through eighth aspects, a TCI state, of the TCI states, for a control resource set (CORESET) is configured for only one reference signal, and each unique reference signal in each CORESET TCI state is a beam failure detection reference signal. In a tenth aspect, alone or in combination with one or more of the first through ninth aspects, a TCI state, of the TCI states, for a CORESET is configured for a plurality of reference signals, and each unique quasi-co-location type-D reference signal in each CORESET TCI state is a beam failure detection reference signal. In an eleventh aspect, alone or in combination with one or more of the first through tenth aspects, the beam failure detection reference signal is selected, from a plurality of candidate beam failure detection reference signals, based at least in part on a rule.

At 430, the UE may initiate a beam failure recovery procedure for the first component carrier and the second component carrier. For example, the UE (e.g., using controller/processor 280, transmit processor 264, TX MIMO processor 266, MOD 254, antenna 252, using controller/processor 280, transmit processor 264, TX MIMO processor 266, MOD 254, antenna 252, and/or the like, and/or the like), may initiate a beam failure recovery procedure for the first component carrier and the at least one second component carrier based at least in part on a measurement of the beam failure detection reference signal and identifying the at least one second component carrier associated with the beam failure detection reference signal, as described in more detail above. In a twelfth aspect, alone or in combination with one or more of the first through eleventh aspects, the UE may determine that the measurement of the beam failure detection reference signal satisfies a threshold indicating a beam failure for the first component carrier, and initiate the beam failure recovery procedure based at least in part on determining that the measurement of the beam failure detection reference signal satisfies the threshold.

Method 400 may include additional aspects, such as any single aspect or any combination of aspects described above and/or in connection with one or more other processes described elsewhere herein.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
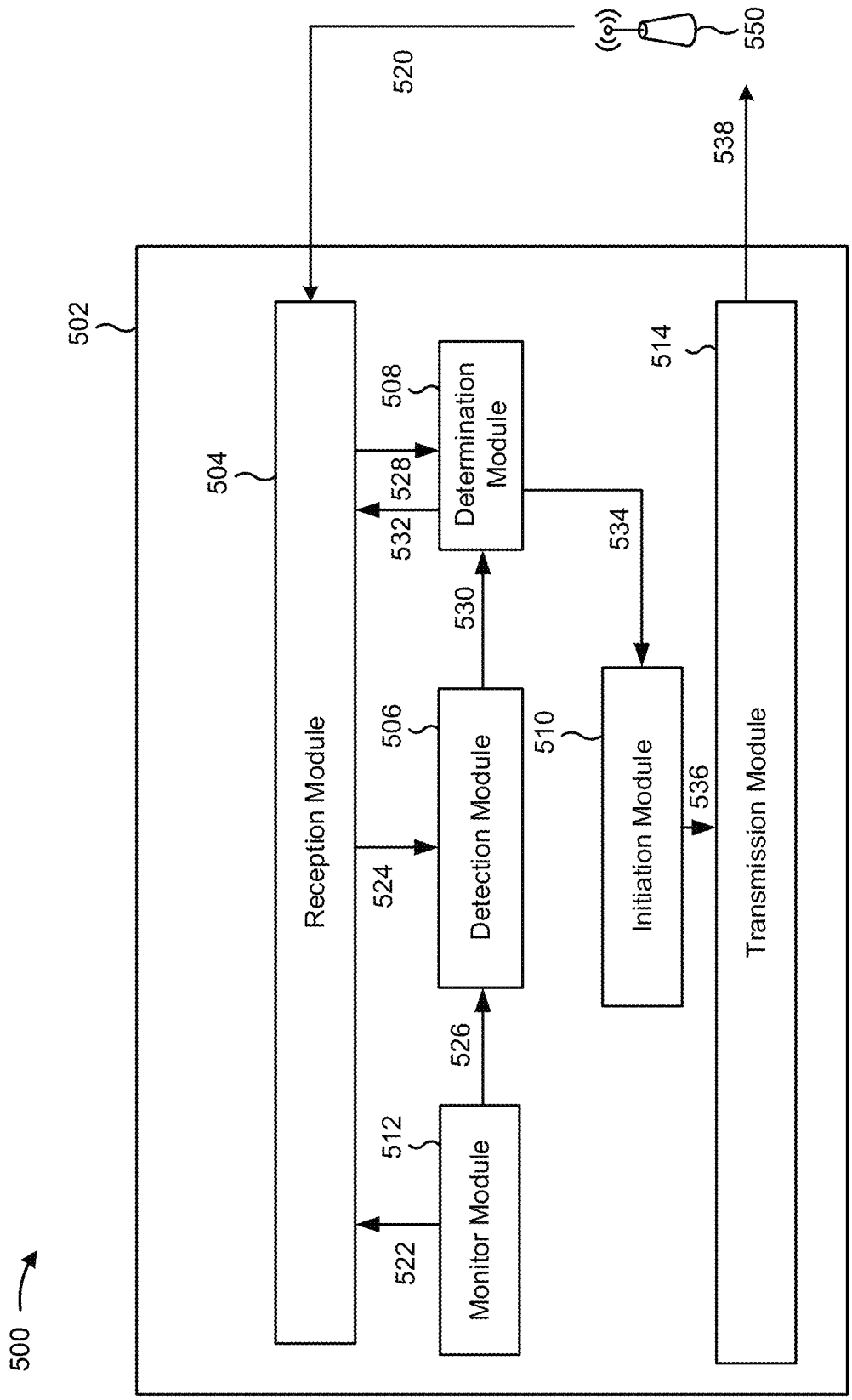
FIG. 5 is a conceptual data flow diagram illustrating the data flow between different modules/means/components in an example apparatus.

FIG. 5 is a conceptual data flow diagram 5 illustrating the data flow between different modules/means/components in an example apparatus 502. The apparatus 502 may be a UE. In some aspects, the apparatus 502 includes a reception module 504, a detection module 506, a determination module 508, an initiation module 510, a monitor module 512, and/or a transmission module 514.

Reception module 504 may receive, as data 520, information associated with detecting a beam failure detection reference signal. For example, the reception module 504 may receive the beam failure detection reference signal from a BS 550, signaling indicating a configuration for receiving the beam failure detection reference signal, and/or the like. In some aspects, reception module 504 may receive the beam failure detection reference signal based at least in part on data 522 from the monitor module 512 associated with controlling the reception module 504. For example, the monitor module 512 may cause the reception module 504 to monitor resources of a group of component carriers.

Detection module 506 may receive, as data 524 from the reception module 504 and/or as data 526 from the monitor module 512, information associated with detecting a beam failure reference signal. For example, the detection module 506 may receive information identifying a transmission from the BS 550 and may detect that the reference signal is a beam failure detection reference signal for detecting a beam failure in a group of component carriers.

Determination module 508 may receive, as data 528 from the detection module 506 and/or as data 530 from the reception module 504, information associated with determining that a beam failure has occurred for a component carrier, information associated with identifying component carriers for which the beam failure is applicable, and/or the like. For example, the determination module 508 may receive information identifying a beam failure detection reference signal, determine that a measurement of the beam failure detection reference signal satisfies a threshold, and determine that a beam failure has occurred. Additionally, or alternatively, the determination module 508 may receive base station signaling identifying a group of component carriers and may determine that a beam failure detected on a first component carrier, of the group of component carriers, is applicable to a second component carrier of the group of component carriers. Additionally, or alternatively, the determination module 508 may determine information relating to a TCI state of a group of component carriers and may provide data 532 to reception module 504 to enable reception module 504 to receive beam failure detection reference signals on the group of component carriers.

Initiation module 510 may receive, as data 534 and from the determination module 508, information associated with initiating a beam failure recovery procedure. For example, based at least in part on the determination module 508 determining that a beam failure has occurred for a first component carrier and/or a second component carrier, the initiation module 510 may provide data 536 to the transmission module 514 to cause the transmission module 514 to transmit data 538 to the BS 550, which initiates the beam failure recovery procedure.

The apparatus may include additional modules that perform each of the blocks of the algorithm in the aforementioned method 400 of FIG. 4 and/or the like. Each block in the aforementioned method 400 of FIG. 4 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example.

In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
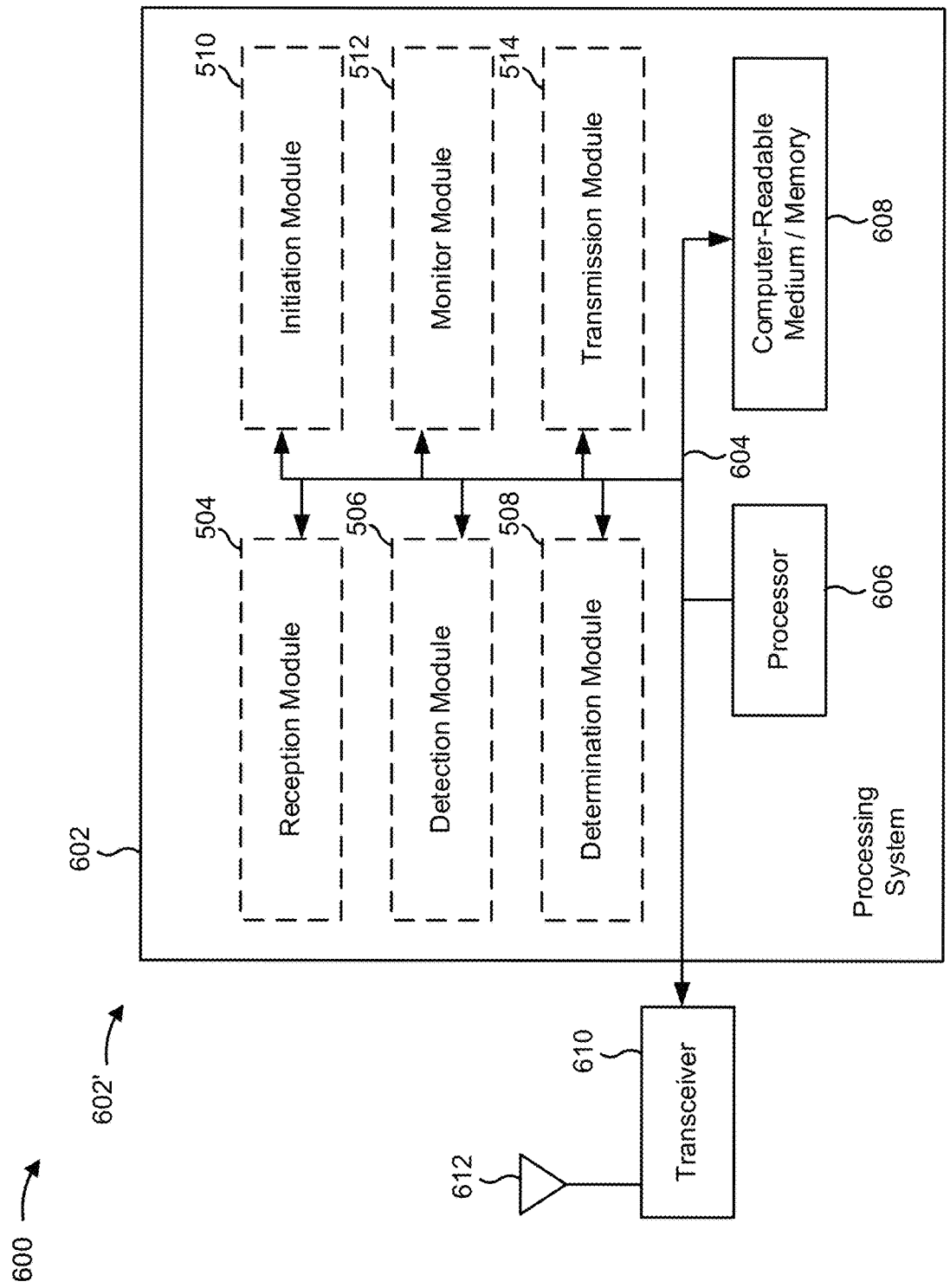
FIG. 6 is a diagram illustrating an example of a hardware implementation for an apparatus employing a processing system.

FIG. 6 is a diagram 600 illustrating an example of a hardware implementation for an apparatus 502' employing a processing system 602. The apparatus 502' may be a UE.

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, 508, 510, 512, and/or 514, and the computer-readable medium/memory 608. The bus 604 may also link various other circuits such as timing sources, peripherals, voltage regulators, and power management circuits, which are well known in the art, and therefore will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602, specifically the reception module 504 In addition, the transceiver 610 receives information from the processing system 602, specifically the transmission module 514, and based at least in part on the received information, generates a signal to be applied to the one or more antennas 612. The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described herein for any particular apparatus. The computer-readable medium/memory 608 may also be used for storing data that is manipulated by the processor 606 when executing software. The processing system further includes at least one of the modules 504, 506, 508, 510, 512, and/or 514. The modules may be software modules running in the processor 606, resident/stored in the computer-readable medium/memory 608, one or more hardware modules coupled to the processor 606, or some combination thereof. The processing system 602 may be a component of the UE 120 and may include the memory 282 and/or at least one of the TX MIMO processor 266, the RX processor 258, and/or the controller/processor 280.

In some aspects, the apparatus 502/502' for wireless communication includes means for detecting a beam failure detection reference signal for a first component carrier of a group of component carriers, means for initiating a beam failure recovery procedure for the first component carrier and at least one second component carrier based at least in part on a measurement of the beam failure detection reference signal and identifying the at least one second component carrier associated with the beam failure detection reference signal, and/or the like. The aforementioned means may be one or more of the aforementioned modules of the apparatus 502 and/or the processing system 602 of the apparatus 502' configured to perform the functions recited by the aforementioned means. As described elsewhere herein, the processing system 602 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 6 is provided as an example. Other examples may differ from what is described in connection with FIG. 6.

Figure 7:
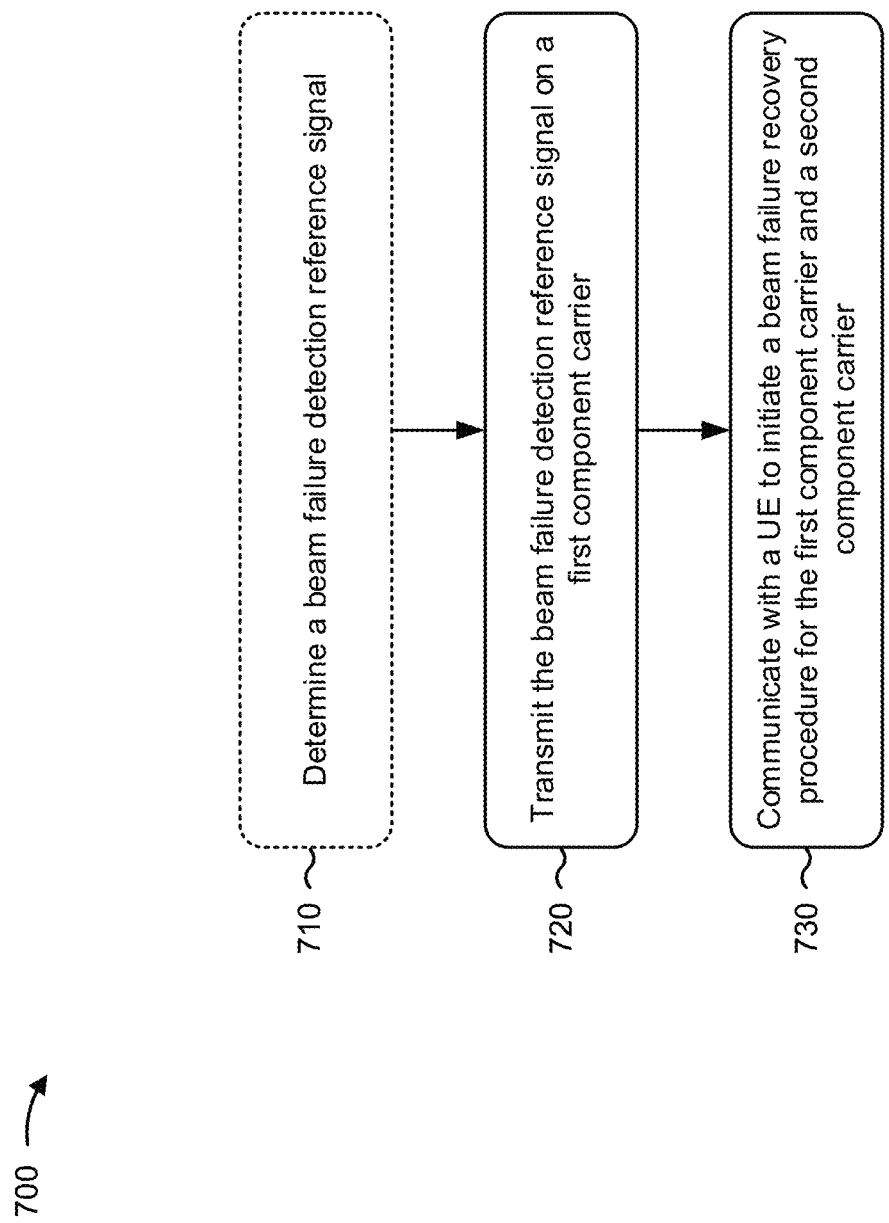
FIG. 7 is a flowchart of a method of wireless communication.

FIG. 7 is a flowchart of a method 700 of wireless communication. The method may be performed by BS (e.g., the BS 110, the BS 310, the BS 550, the apparatus 802/802', and/or the like).

At 710, in some aspects, the BS may determine a beam failure detection reference signal. For example, the BS (e.g., using controller/processor 240 and/or the like) may determine a beam failure detection reference signal, of a first component carrier of a group of component carriers, to enable detection of a beam failure for the first component carrier and at least one second component carrier of the group of component carriers, as described in more detail above. In a first aspect, the beam failure detection reference signal is a quasi-co-location type-D reference signal corresponding to each unique quasi-co-location type-D source (of a plurality of component carriers) and is configured on a single component carrier of the group of component carriers.

At 720, the BS may transmit the beam failure detection reference signal on a first component carrier. For example, the BS (e.g., using controller/processor 240, transmit processor 220, TX MIMO processor 230, MOD 232, antenna 234, and/or the like) may transmit, to a UE, a beam failure detection reference signal on a first component carrier of a group of component carriers that share a quasi-co-location parameter, as described in more detail above. In a second aspect, alone or in combination with the first aspect, the BS may forgo transmission of another beam failure detection reference signal using the at least one second component carrier, based at least in part on determining the beam failure detection reference signal of the first component carrier, to enable detection of the beam failure for the first component carrier and the at least one second component carrier.

At 730, the BS may communicate with a UE to initiate a beam failure recovery procedure for the first component carrier and a second component carrier. For example, the BS (e.g., using antenna 234, DEMOD 232, MIMO detector 236, receive processor 238, controller/processor 240, transmit processor 220, TX MIMO processor 230, MOD 232, antenna 234, and/or the like) may communicate with the UE to initiate a beam failure recovery procedure for the first component carrier and at least one second component carrier, of the group of component carriers, based at least in part on transmitting the beam failure detection reference signal on the first component carrier, as described in more detail above.

Method 700 may include additional aspects, such as any single aspect or any combination of aspects described below and/or in connection with one or more other processes described elsewhere herein.

In a third aspect, alone or in combination with one or more of the first and second aspects, the BS may transmit, to the UE, signaling identifying the group of component carriers, to enable detection of the beam failure for the at least one second component carrier.

In a fourth aspect, alone or in combination with one or more of the first through third aspects, the signaling is at least one of radio resource control signaling, MAC control element signaling, downlink control information signaling, or beam update signaling.

In a fifth aspect, alone or in combination with one or more of the first through fourth aspects, the BS may transmit, to the UE, signaling that configures monitoring for the beam failure detection reference signal on the first component carrier to enable detection of the beam failure for the at least one second component carrier.

In a sixth aspect, alone or in combination with one or more of the first through fifth aspects, the signaling is at least one of radio resource control signaling, MAC control element signaling, downlink control information signaling, or beam update signaling.

In a seventh aspect, alone or in combination with one or more of the first through sixth aspects, the BS may determine TCI states for the group of component carriers, determine a configuration for transmitting the beam failure detection reference signal based at least in part on the TCI states for the group of component carriers, and transmit the beam failure detection reference signal based at least in part on the configuration for transmitting the beam failure detection reference signal.

In an eighth aspect, alone or in combination with one or more of the first through seventh aspects, a TCI state, of the TCI states, for a CORESET is configured for only one reference signal.

In a ninth aspect, alone or in combination with one or more of the first through eighth aspects, a TCI state, of the TCI states, for a CORESET is configured for a plurality of reference signals.

In a tenth aspect, alone or in combination with one or more of the first through ninth aspects, the BS may select the beam failure detection reference signal, from a plurality of candidate beam failure detection reference signals, based at least in part on a rule.

In an eleventh aspect, alone or in combination with one or more of the first through tenth aspects, the BS may transmit, to the UE, signaling indicating that the UE is to monitor for the beam failure detection reference signal on a subset of the group of component carriers, wherein the subset of the group of component carriers includes the first component carrier.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
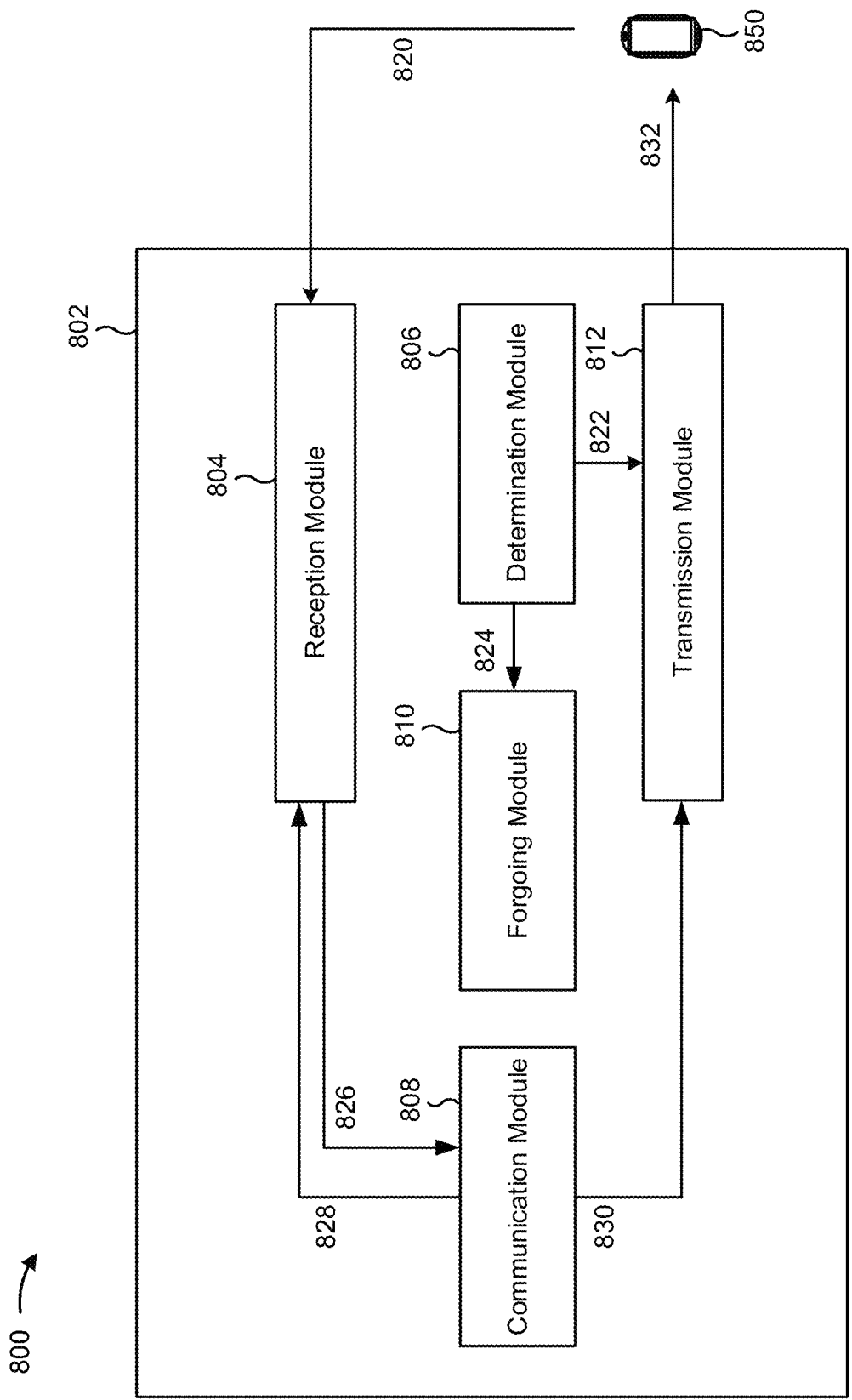
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a BS. In some aspects, the apparatus 802 includes a reception module 804, a determination module 806, a communication module 808, a forgoing module 810, and/or a transmission module 812.

Reception module 804 may receive, as data 820 from a UE 850, information associated with initiating a beam failure detection recovery procedure. For example, after transmitting a beam failure detection reference signal on a first component carrier, the reception module 804 may receive signaling on the first component carrier, on a second component carrier, and/or the like to initiate a beam failure recovery procedure on the first component carrier, the second component carrier, and/or the like.

Determination module 806 may determine a beam failure detection reference signal that is to be transmitted on a first component carrier. For example, the determination module 806 may determine that a particular beam failure detection reference signal resource is to be used for beam failure detection reference signal transmission, and may provide data 822 to the transmission module 812 to cause the transmission module 812 to transmit the beam failure detection reference signal. Additionally, or alternatively, the determination module 806 may determine a group of component carriers associated with the beam failure detection reference signal and may cause the transmission module 812 to transmit signaling identifying the group of component carriers. Additionally, or alternatively, the determination module 806 may provide data 824 to forgoing module 810 to indicate that the apparatus 802 is to forgo transmission of one or more other beam failure detection reference signals on one or more other component carriers.

Communication module 808 may receive, as data 826 and from the reception module 804, information indicating that UE 850 has initiated a beam failure recovery procedure. In this case, communication module 808 may provide, to the reception module 804 and as data 828 and/or to the transmission module 812 and as data 830, information associated with configuring communication to perform the beam failure recovery procedure. For example, the communication module 808 may cause the reception module 804 to receive the initiation of the beam failure recovery procedure and/or may cause transmission module 812 to transmit signaling associated with performing beam failure recovery.

The transmission module 812 may transmit data 832 to the UE 850. For example, the transmission module 812 may transmit a beam failure detection reference signal (e.g., on a first component carrier to enable beam failure recovery on a group of component carriers). Additionally, or alternatively, the transmission module 812 may transmit signaling identifying a group of component carriers, a configuration for receiving a beam failure detection reference signal, and/or the like. Additionally, or alternatively, the transmission module 812 may transmit signaling associated with performing beam failure recovery.

The apparatus may include additional modules that perform each of the blocks of the algorithm in the aforementioned method 700 of FIG. 7 and/or the like. Each block in the aforementioned method 700 of FIG. 7 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
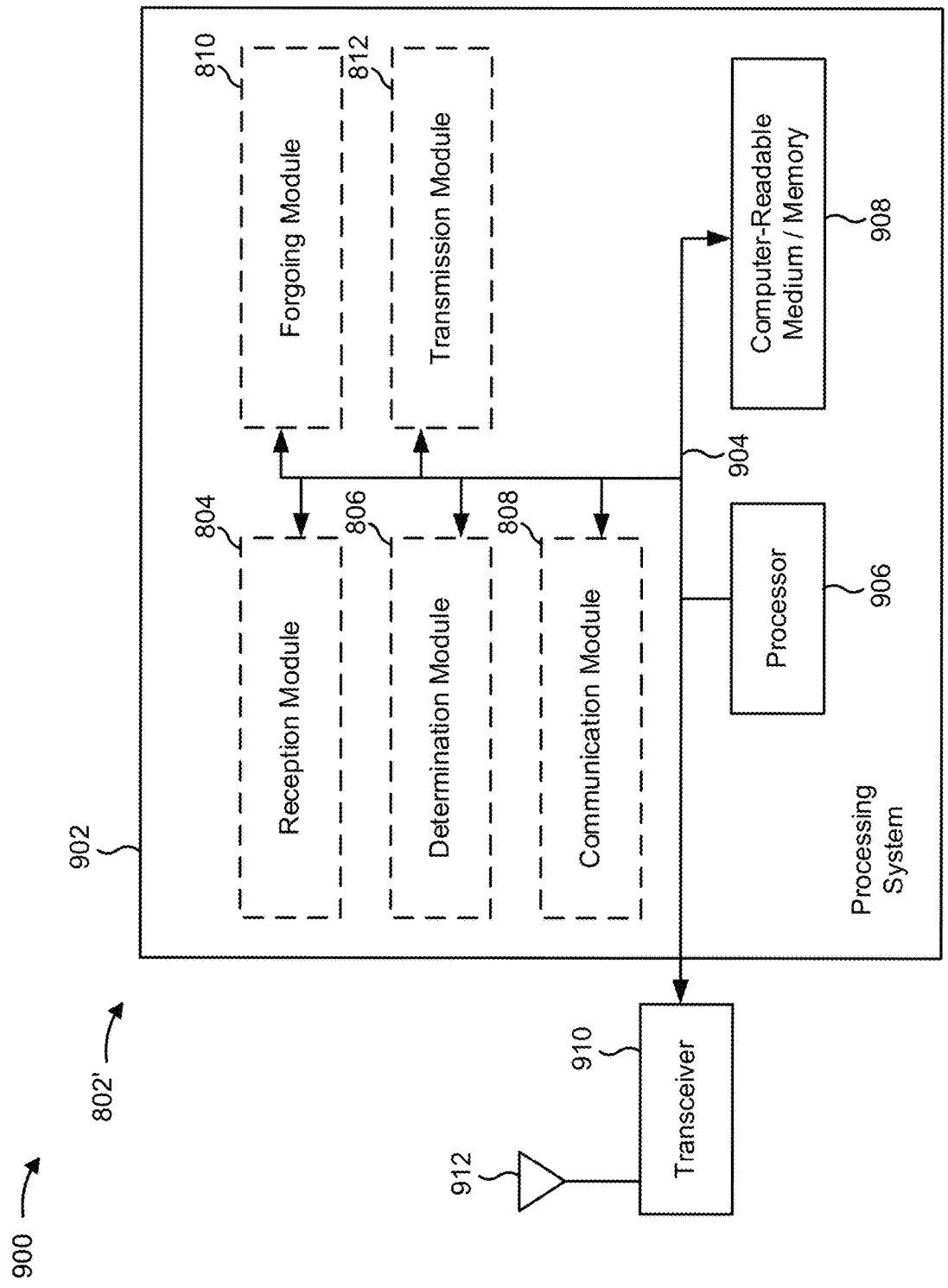
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a BS.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, 810, and/or 812, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 812, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, 808, 810, and/or 812. The modules may be software modules running in the processor 906, resident/stored in the computer-readable medium/memory 908, one or more hardware modules coupled to the processor 906, or some combination thereof. The processing system 902 may be a component of the BS 110 and may include the memory 242 and/or at least one of the TX MIMO processor 230, the RX processor 238, and/or the controller/processor 240.

In some aspects, the apparatus 802/802' for wireless communication includes means for transmitting, to a UE, a beam failure detection reference signal on a first component carrier of a group of component carriers that share a quasi-co-location parameter, means for communicating with the UE to initiate a beam failure recovery procedure for the first component carrier and at least one second component carrier, of the group of component carriers, based at least in part on transmitting the beam failure detection reference signal on the first component carrier, and/or the like. The aforementioned means may be one or more of the aforementioned modules of the apparatus 802 and/or the processing system 902 of the apparatus 802' configured to perform the functions recited by the aforementioned means. As described elsewhere herein, the processing system 902 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

It should be understood that the specific order or hierarchy of blocks in the processes/flowcharts disclosed is an illustration of example approaches. Based upon design preferences, it should be understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   detecting a beam failure detection reference signal for a first component carrier of a group of component carriers, wherein the beam failure detection reference signal is a quasi-co-location type-D reference signal corresponding to each unique quasi-co-location type-D source, of a plurality of component carriers, configured on a single component carrier of the group of component carriers, and wherein at least one second component carrier, of the group of component carriers, and the first component carrier share a quasi-co-location parameter; and
   initiating a beam failure recovery procedure for the first component carrier and the at least one second component carrier based at least in part on a measurement of the beam failure detection reference signal and identifying the at least one second component carrier associated with the beam failure detection reference signal.

2. The method of claim 1, further comprising:
   determining that the measurement of the beam failure detection reference signal satisfies a threshold indicating a beam failure for the first component carrier; and
   wherein initiating the beam failure recovery procedure comprises:
      initiating the beam failure recovery procedure based at least in part on determining that the measurement of the beam failure detection reference signal satisfies the threshold.

3. The method of claim 1, further comprising:
   monitoring resources of the group of component carriers; and
   wherein detecting the beam failure detection reference signal for the first component carrier comprises:
      detecting the beam failure detection reference signal for the first component carrier based at least in part on monitoring the resources across the group of component carriers.

4. The method of claim 1, further comprising:
   receiving signaling identifying the group of component carriers; and
   determining the at least one second component carrier based at least in part on the signaling identifying the group of component carriers.

5. The method of claim 4, wherein the base station signaling is at least one of:
   radio resource control signaling,
   medium access control (MAC) control element signaling,
   downlink control information signaling, or
   beam update signaling.

6. The method of claim 1, further comprising:
   receiving signaling that configures monitoring for the beam failure detection reference signal; and
   wherein receiving the beam failure detection reference signal comprises:
      receiving the beam failure detection reference signal based at least in part on the signaling that configures monitoring for the beam failure detection reference signal.

7. The method of claim 6, wherein the signaling is at least one of:
   radio resource control signaling,
   medium access control (MAC) control element signaling,
   downlink control information signaling, or
   beam update signaling.

8. The method of claim 1, further comprising:
   determining a configuration for monitoring for the beam failure detection reference signal based at least in part on a control resource set (CORESET) transmission control indicator (TCI) state for the group of component carriers; and
   wherein receiving the beam failure detection reference signal comprises:
      receiving the beam failure detection reference signal based at least in part on the configuration for monitoring for the beam failure detection reference signal.

9. The method of claim 8, wherein a TCI state, of the TCI states, for a CORESET is configured for only one reference signal; and
   wherein each unique reference signal in each CORESET TCI state is a beam failure detection reference signal.

10. The method of claim 8, wherein a TCI state, of the TCI states, for a CORESET is configured for a plurality of reference signals; and
    wherein the quasi-co-location type-D reference signal is in CORESET TCI state of the TCI states.

11. The method of claim 1, wherein the beam failure detection reference signal is selected, from a plurality of candidate beam failure detection reference signals, based at least in part on a rule.

12. The method of claim 1, further comprising:
    receiving signaling indicating that the UE is to monitor for the beam failure detection reference signal on a subset of the group of component carriers, wherein the subset of the group of component carriers includes the first component carrier; and
    monitoring, to receive the beam failure detection reference signal on the subset of the group of component carriers, based at least in part on the signaling; and
    wherein receiving the beam failure detection reference signal comprises:
       receiving the beam failure detection reference signal based at least in part on monitoring to receive the beam failure detection reference signal on the subset of the group of component carriers.

13. A method of wireless communication performed by a base station (BS), comprising:

transmitting, to a user equipment (UE), a beam failure detection reference signal on a first component carrier of a group of component carriers that share a quasi-co-location parameter, wherein the beam failure detection reference signal is a quasi-co-location type-D reference signal corresponding to each unique quasi-co-location type-D source, of a plurality of component carriers, configured on a single component carrier of the group of component carriers; and communicating with the UE to initiate a beam failure recovery procedure for the first component carrier and at least one second component carrier, of the group of component carriers, based at least in part on transmitting the beam failure detection reference signal on the first component carrier.

14. The method of claim 13, further comprising:
forgoing transmission of another beam failure detection reference signal using the at least one second component carrier, based at least in part on determining the beam failure detection reference signal of the first component carrier, to enable detection of the beam failure for the first component carrier and the at least one second component carrier.

15. The method of claim 13, further comprising:
transmitting, to the UE, signaling identifying the group of component carriers, to enable detection of the beam failure for the at least one second component carrier.

16. The method of claim 15, wherein the signaling is at least one of:
radio resource control signaling,
medium access control (MAC) control element signaling,
downlink control information signaling, or
beam update signaling.

17. The method of claim 13, further comprising:
transmitting, to the UE, signaling that configures monitoring for the beam failure detection reference signal on the first component carrier to enable detection of the beam failure for the at least one second component carrier.

18. The method of claim 17, wherein the signaling is at least one of:
radio resource control signaling,
medium access control (MAC) control element signaling,
downlink control information signaling, or
beam update signaling.

19. The method of claim 13, further comprising:
determining transmission control indicator (TCI) states for the group of component carriers; and
determining a configuration for transmitting the beam failure detection reference signal based at least in part on the TCI states for the group of component carriers; and
wherein transmitting the beam failure detection reference signal comprises:
transmitting the beam failure detection reference signal based at least in part on the configuration for transmitting the beam failure detection reference signal.

20. The method of claim 19, wherein a TCI state, of the TCI states, for a control resource set (CORESET) is configured for only one reference signal; and
wherein each unique reference signal in each CORESET TCI state is a beam failure detection reference signal.

21. The method of claim 19, wherein a TCI state, of the TCI states, for a control resource set (CORESET) is configured for a plurality of reference signals; and
wherein the quasi-co-location type-D reference signal is in a CORESET TCI state of the TCI states.

22. The method of claim 13, further comprising:
selecting the beam failure detection reference signal, from a plurality of candidate beam failure detection reference signals, based at least in part on a rule.

23. The method of claim 13, further comprising:
transmitting, to the UE, signaling indicating that the UE is to monitor for the beam failure detection reference signal on a subset of the group of component carriers, wherein the subset of the group of component carriers includes the first component carrier.

24. A user equipment (UE) for wireless communication, comprising:
a memory; and
one or more processors coupled to the memory, the one or more processors configured to:
detect a beam failure detection reference signal for a first component carrier of a group of component carriers, wherein the beam failure detection reference signal is a quasi-co-location type-D reference signal corresponding to each unique quasi-co-location type-D source, of a plurality of component carriers, configured on a single component carrier of the group of component carriers, and wherein at least one second component carrier, of the group of component carriers, and the first component carrier share a quasi-co-location parameter; and
initiate a beam failure recovery procedure for the first component carrier and the at least one second component carrier based at least in part on a measurement of the beam failure detection reference signal and identifying the at least one second component carrier associated with the beam failure detection reference signal.

25. A base station (BS) for wireless communication, comprising:
a memory; and
one or more processors coupled to the memory, the one or more processors configured to:
transmit, to a user equipment (UE), a beam failure detection reference signal on a first component carrier of a group of component carriers that share a quasi-co-location parameter, wherein the beam failure detection reference signal is a quasi-co-location type-D reference signal corresponding to each unique quasi-co-location type-D source, of a plurality of component carriers, configured on a single component carrier of the group of component carriers; and
communicate with the UE to initiate a beam failure recovery procedure for the first component carrier and at least one second component carrier, of the group of component carriers, based at least in part on transmitting the beam failure detection reference signal on the first component carrier.

26. The BS of claim 25, wherein the one or more processors are further configured to:
forgo transmission of another beam failure detection reference signal using the at least one second component carrier, based at least in part on determining the beam failure detection reference signal of the first component carrier, to enable detection of the beam failure for the first component carrier and the at least one second component carrier.

27. The UE of claim 24, wherein the one or more processors are further configured to:
receive signaling identifying the group of component carriers; and determine the at least one second component carrier based at least in part on the signaling identifying the group of component carriers.

28. The UE of claim 24, wherein the one or more processors are further configured to:
receive signaling indicating that the UE is to monitor for the beam failure detection reference signal on a subset of the group of component carriers, wherein the subset of the group of component carriers includes the first component carrier; and
monitor, to receive the beam failure detection reference signal on the subset of the group of component carriers, based at least in part on the signaling.

29. The BS of claim 25, wherein the one or more processors are further configured to:
transmit, to the UE, signaling identifying the group of component carriers, to enable detection of the beam failure for the at least one second component carrier.

30. The BS of claim 25, wherein the one or more processors are further configured to:
transmit, to the UE, signaling that configures monitoring for the beam failure detection reference signal on the first component carrier to enable detection of the beam failure for the at least one second component carrier.

* * * * *